(12) United States Patent
Bhaskara et al.

(10) Patent No.: US 10,831,910 B2
(45) Date of Patent: Nov. 10, 2020

(54) PROVIDING DATA PROTECTION AND PRIVACY AS A SERVICE IN A CLOUD PLATFORM

(71) Applicant: SAP SE, Walldorf (DE)

(72) Inventors: Srinivas Bhaskara, Bangalore (IN); Vinay C, Bangalore (IN); Vijay G, Bangalore (IN); Zainul Abidin Mulla, Dharwad (IN); Pranjal Chugh, New Delhi (IN); Miguel Rolando Heineken, Rauenberg (DE)

(73) Assignee: SAP SE, Walldorf (DE)

( * ) Notice: Subject to any disclaimer, the term of this patent is extended or adjusted under 35 U.S.C. 154(b) by 250 days.

(21) Appl. No.: 15/680,897

(22) Filed: Aug. 18, 2017

(65) Prior Publication Data
US 2019/0057218 A1 Feb. 21, 2019

(51) Int. Cl.
| H04L 29/00 | (2006.01) |
| G06F 21/62 | (2013.01) |
| H04L 29/06 | (2006.01) |
| H04L 29/08 | (2006.01) |

(52) U.S. Cl.
CPC .......... *G06F 21/62* (2013.01); *G06F 21/6245* (2013.01); *H04L 63/029* (2013.01); *H04L 63/10* (2013.01); *H04L 63/102* (2013.01); *H04L 67/1097* (2013.01); *G06F 2221/2143* (2013.01)

(58) Field of Classification Search
CPC ................. G06F 21/62; G06F 21/6245; G06F 2221/2143; H04L 63/029; H04L 63/10; H04L 63/102; H04L 67/1097
See application file for complete search history.

(56) References Cited

U.S. PATENT DOCUMENTS

| 7,529,784 | B2 * | 5/2009 | Kavuri | G06F 3/0605 |
| 8,365,241 | B1 * | 1/2013 | Gunda | H04L 67/02 |
| | | | | 726/1 |
| 8,850,516 | B1 * | 9/2014 | Hrebicek | G06F 16/21 |
| | | | | 726/1 |
| 9,811,525 | B1 * | 11/2017 | Ge | G06F 16/162 |
| 9,823,978 | B2 * | 11/2017 | Mutha | G06F 16/162 |
| 2004/0167898 | A1 * | 8/2004 | Margolus | G06F 16/2358 |
| 2008/0065665 | A1 * | 3/2008 | Pomroy | G06F 16/20 |

(Continued)

OTHER PUBLICATIONS

Sudhindra Kumar, Oct. 14, 2014, Data Retention and Disposal in the cloud, https://nextlabs.wordpress.com/2014/10/13/data-retention-and-disposal-in-the-cloud/, p. 1-2 (Year: 2014).*

(Continued)

*Primary Examiner* — Don G Zhao
(74) *Attorney, Agent, or Firm* — Klarquist Sparkman LLP (57) ABSTRACT

A retention service registers a target system as a consumer service. A cloud platform provides services to each of multiple consumer service. Retention rule information about the target system is received and reflects a data retention requirement. A rule is created that corresponds to the data retention requirement. A configuration is defined that specifies recurring future invocations of the rule. The rule is invoked per the configuration and a query is sent to the target system, the query configured to extract data. Extracted data is received and the rule is applied thereto. An action specified by the rule is taken with regard to the data.

16 Claims, 7 Drawing Sheets

(56) References Cited

U.S. PATENT DOCUMENTS

| | | | | |
|---|---|---|---|---|
| 2009/0327021 | A1* | 12/2009 | Paknad | G06Q 10/06 705/7.27 |
| 2010/0162391 | A1* | 6/2010 | Loveland | G06F 11/1461 726/22 |
| 2010/0332401 | A1* | 12/2010 | Prahlad | H04L 67/1097 705/80 |
| 2013/0262392 | A1* | 10/2013 | Vibhor | G06F 16/178 707/654 |
| 2013/0263289 | A1* | 10/2013 | Vijayan | G06F 21/60 726/31 |
| 2013/0268740 | A1* | 10/2013 | Holt | G06F 21/6272 711/163 |
| 2014/0012767 | A1* | 1/2014 | Schmidt | G06Q 50/18 705/311 |
| 2014/0074793 | A1* | 3/2014 | Doering | G06F 16/113 707/667 |
| 2014/0188804 | A1* | 7/2014 | Gokhale | G06F 21/6218 707/645 |
| 2014/0201135 | A1* | 7/2014 | Smid | G06F 21/604 707/610 |
| 2014/0244593 | A1* | 8/2014 | Stakutis | G06F 16/125 707/662 |
| 2014/0379670 | A1* | 12/2014 | Kuhr | G06F 21/6245 707/692 |
| 2015/0066865 | A1* | 3/2015 | Yara | G06F 16/21 707/667 |
| 2015/0379303 | A1* | 12/2015 | LaFever | G06F 21/6254 726/28 |
| 2016/0149858 | A1* | 5/2016 | Asaithambi | H04L 63/029 726/12 |
| 2016/0350339 | A1 | 12/2016 | Lehnert et al. | |
| 2016/0378380 | A1* | 12/2016 | Bish | G06F 3/0608 711/162 |
| 2017/0169067 | A1* | 6/2017 | Jose | G06F 16/278 |
| 2017/0235848 | A1* | 8/2017 | Van Dusen | G06F 16/904 705/12 |
| 2017/0255790 | A1* | 9/2017 | Barrett | G16B 20/20 |
| 2017/0310746 | A1* | 10/2017 | Roundhill | G06Q 10/1097 |
| 2018/0253218 | A1* | 9/2018 | Levesque | G06F 16/9038 |
| 2018/0276223 | A1* | 9/2018 | Dhanasekaran | G06F 16/1844 |
| 2018/0276232 | A1* | 9/2018 | Dhanasekaran | G06F 3/0605 |
| 2018/0316577 | A1* | 11/2018 | Freeman | H04L 41/5009 |
| 2018/0329940 | A1* | 11/2018 | Tiku | G06F 16/21 |
| 2018/0349460 | A1* | 12/2018 | Lacerda | H04L 67/1091 |
| 2019/0057101 | A1* | 2/2019 | Esserlieu | G06F 16/125 |
| 2019/0057218 | A1* | 2/2019 | Bhaskara | H04L 63/029 |
| 2019/0108044 | A1* | 4/2019 | Coven | G06N 20/00 |

OTHER PUBLICATIONS

SAP AG, "Information Lifecycle Management in an SAP Environment", Version 3.0, SAP White Paper, Feb. 2008, 30 pages.

SAP AG, "SAP Solutions for Information Lifecycle Management", 2013, 59 pages.

* cited by examiner

PROVIDING DATA PROTECTION AND PRIVACY AS A SERVICE IN A CLOUD PLATFORM

TECHNICAL FIELD

This description relates to providing data protection and privacy as a service in a cloud platform.

BACKGROUND

Data protection and privacy (DPP) is very important in today's world in making sure a software system or other component is legally DPP compliant in one or more countries, or worldwide. DPP relates to the protection of private data. This can be data from a person and/or company data. In addition to compliance with general data privacy acts, it may be necessary to consider compliance with industry-specific legislation in one or more countries. For example, various countries around the world can require compliance with their DPP regulations.

An approach to DPP compliance has been tried in existing software systems, such as in human capital management (HCM) systems. That approach involves all services on the cloud platform having hardcoded DPP rules as part of their application. This approach can be associated with disadvantages. Management of such rules may require code-refactoring and/or rebuilding of the application. For example, this can lead to additional maintenance cost. Because every service on the cloud platform builds its own DPP module, significant redundant and/or replicated effort can be necessitated across the platform.

SUMMARY

A first aspect comprises a computer program product. The computer program product is tangibly embodied on a non-transitory computer-readable storage medium and includes instructions. When executed, the instructions are configured to cause at least one processor to register, at a cloud platform, a first target system as a consumer service having a uniform resource identifier (URI), the cloud platform configured to provide services to each of multiple consumer services when registered, the services including a data retention service. When executed, the instructions are configured to cause at least one processor to receive, at the cloud platform, retention rule information about the first target system, the retention rule information reflecting a first data retention requirement applying to the first target system. When executed, the instructions are configured to cause at least one processor to create, using the received retention rule information, a first rule in the cloud platform that corresponds to the first data retention requirement. When executed, the instructions are configured to cause at least one processor to define, using the received retention rule information, a configuration in the cloud platform that specifies recurring future invocations of the rule. When executed, the instructions are configured to cause at least one processor to invoke the rule according to the configuration. When executed, the instructions are configured to cause at least one processor to send, based on the invocation of the first rule, a first query to the first target system using the URI, the first query configured to extract data from the first target system according to the first rule. When executed, the instructions are configured to cause at least one processor to receive, at the cloud platform, the data extracted from the first target system using the first query. When executed, the instructions are configured to cause at least one processor to apply, at the cloud platform, the first rule to the received data. When executed, the instructions are configured to cause at least one processor to take an action specified by the first rule with regard to the data or with regard to the received data.

Implementations can include any or all of the following features. Taking the action can comprise sending a second query to the first target system to delete on the first target system a data record of the data, the second query being based on identifying, when applying the first rule to the received data, a deletion requirement applicable to the data record. Taking the action can comprise sending a data record of the received data, from the cloud platform to an archival system to archive the data record on the archival system, the sending being based on identifying, when applying the first rule to the received data, an archival requirement applicable to the data record. The instructions can further be configured to cause the at least one processor to send a second query to the first target system to delete the data record on the first target system, the second query being based on identifying, when applying the first rule to the received data, also a deletion requirement applicable to the data record on the first target system. The instructions can further be configured to cause the at least one processor to perform the sending of the data record from the cloud platform to the archival system in multiple batches.

The first target system can be implemented to operate in a first country, wherein the first data retention requirement is specific to the first country. The instructions can further be configured to cause the at least one processor to register, at the cloud platform, a second target system as a second consumer service, the second target system essentially identical to the first target system except for being implemented to operate in a second country. The instructions can further be configured to cause the at least one processor to receive, at the cloud platform, second retention rule information about the second target system, the second retention rule information reflecting a second data retention requirement that is specific to the second country and applies to the second target system, the second retention rule information and the second data retention requirement being different from the first retention rule information and the first data retention requirement, respectively. The instructions can further be configured to cause the at least one processor to create, using the second received retention rule information, a second rule in the cloud platform that corresponds to the second data retention requirement, the second rule different from the first rule. The instructions can further be configured to cause the at least one processor to define, using the second received retention rule information, a second configuration in the cloud platform that specifies recurring future invocations of the second rule, the second configuration different from the first configuration.

The services can further include an access restriction service, wherein the instructions are further configured to cause the at least one processor to receive, at the cloud platform, access rule information about the first target system, the access rule information reflecting a data access restriction applying to the first target system. The instructions can further be configured to cause the at least one processor to create, using the received access rule information, a second rule in the cloud platform that corresponds to the data access restriction. The instructions can further be configured to cause the at least one processor to define, using the received access rule information, a second configuration in the cloud platform that specifies recurring future invocations of the second rule.

The services can further include a masking-of-information service, wherein the instructions are further configured to cause the at least one processor to receive, at the cloud platform, masking rule information about the first target system, the masking rule information reflecting a data masking requirement applying to the first target system. The instructions can further be configured to cause the at least one processor to create, using the received masking rule information, a second rule in the cloud platform that corresponds to the data masking requirement. The instructions can further be configured to cause the at least one processor to define, using the received masking rule information, a second configuration in the cloud platform that specifies recurring future invocations of the second rule.

The services can further include an information reporting service, wherein the instructions are further configured to cause the at least one processor to receive, at the cloud platform, reporting rule information about the first target system, the reporting rule information reflecting a data reporting requirement applying to the first target system. The instructions can further be configured to cause the at least one processor to create, using the received reporting rule information, a second rule in the cloud platform that corresponds to the data reporting requirement. The instructions can further be configured to cause the at least one processor to define, using the received reporting rule information, a second configuration in the cloud platform that specifies recurring future invocations of the second rule.

In a second aspect, a cloud platform system comprises a rule engine, implemented using at least one processor and configured to receive retention rule information about a target system having a uniform resource identifier (URI). The retention rule information reflects a data retention requirement applying to the target system. The rule engine can be configured to create, using the received retention rule information, a rule that corresponds to the data retention requirement. The cloud platform system can include a scheduler service, implemented using at least one processor and configured to define, using the received retention rule information, a configuration that specifies recurring future invocations of the rule. The cloud platform system can include a query generator, implemented using at least one processor and configured to invoke the rule according to the configuration. The query generator can be configured to send, based on the invocation of the rule, a first query to the target system using the URI, the first query configured to extract data from the target system according to the rule. The cloud platform system can receive the data extracted from the target system using the first query, apply the rule to the received data, and take an action specified by the rule with regard to the data or with regard to the received data.

Implementations can include any or all of the following features. The cloud platform system can further comprise an archival system configured to receive a data record of the data from the cloud platform, and archive the data record on the archival system. The target system can comprise business logic, a database, and an Open Data Protocol (OData) services component, and the cloud platform system can communicate with the target system via the OData services component. The target system can comprise business logic and a database, and have a firewall toward the cloud platform system. The cloud platform system can further comprise a database tunnel component that facilitates the cloud platform system to communicate with the database without going via the business logic.

The target system can comprise business logic, a database, and an OData services component. The cloud platform system can further comprise a logging module that tracks access to the data in the database. The cloud platform system can communicate with the target system via the OData services component.

In a third aspect, a method comprises registering, at a cloud platform, a target system as a consumer service having a uniform resource identifier (URI). The cloud platform is configured to provide services to each of multiple consumer services when registered, the services including a data retention service. The method includes receiving, at the cloud platform, retention rule information about the target system, the retention rule information reflecting a data retention requirement applying to the target system. The method includes creating, using the received retention rule information, a rule in the cloud platform that corresponds to the data retention requirement. The method includes defining, using the received retention rule information, a configuration in the cloud platform that specifies recurring future invocations of the rule. The method includes invoking the rule according to the configuration. The method includes sending, based on the invocation of the rule, a first query to the target system using the URI, the first query configured to extract data from the target system according to the rule. The method includes receiving, at the cloud platform, data extracted from the target system using the first query. The method includes applying, at the cloud platform, the rule to the received data. The method includes taking an action specified by the rule with regard to the data or with regard to the received data.

Implementations can include any or all of the following features. Taking the action can comprise sending a second query to the target system to delete on the target system a data record of the data. The second query can be based on identifying, when applying the rule to the received data, a deletion requirement applicable to the data record. Taking the action can comprise sending a data record of the received data, from the cloud platform to an archival system to archive the data record on the archival system. The sending can be based on identifying, when applying the rule to the received data, an archival requirement applicable to the data record. The method can further comprise sending a second query to the target system to delete the data record on the target system. The second query can be based on identifying, when applying the rule to the received data, also a deletion requirement applicable to the data record on the target system. The method can further comprise sending the data record from the cloud platform to the archival system in multiple batches.

The target system can comprise business logic and a database, and have a firewall toward the cloud platform. The cloud platform can further comprise a database tunnel component. The method can further comprise communicating with the database without going via the business logic.

The details of one or more implementations are set forth in the accompanying drawings and the description below. Other features will be apparent from the description and drawings, and from the claims.

DETAILED DESCRIPTION

This document describes systems and techniques to provide data protection and privacy (DPP) as a service in a cloud platform. DPP as a service can be provided as a cloud solution to manage DPP legal requirements of existing and upcoming micro services. This document will exemplify some architecture and design details, including, but not limited to, for aspects such as retention of data, data masking, read access logging and reporting.

Some existing systems, such as Enterprise Resource Planning (ERP) systems from SAP SE, provide solutions within the specific system that handle legal requirements, including DPP. An example of such a system is information lifecycle management (ILM) in the ERP system. Implementations of the present disclosure, on the other hand, can provide their own system, dedicated exclusively to administering data around the persons (natural or legal) with regard to DPP requirements. Such an approach can therefore be used across different systems. Accordingly, some implementations can be considered to provide a framework for rule based data lifecycle management, for DPP purposes, on a cloud platform.

Implementations can provide advantages, including, but not limited to, the following. Such a framework can provide transparency regarding DPP to the various stakeholders in the data lifecycle. A consistent approach to managing private data can be provided. Moreover, if multiple systems need to manage private data in a collaborative way, a framework can facilitate this. The possibility of working in a hybrid (e.g., partially cloud-based, partially on-premise) environment can be provided. The need to re-use a component, and therefore the task of adapting the component for its new use, can be avoided. Redundancy in developing or building components can be avoided. It can be possible to manage data in a highly available environment with the ability to manage disasters.

Implementations can provide a technical solution to the following technical problems. The need to adapt and/or recode a service according to DPP requirements in each country of deployment can be eliminated, thus eliminating the situation where the service as implemented is deemed defective, or cannot be used, because it is non-compliant with DPP regulations. The risk that a service is implemented with incomplete or incorrect DPP safeguards can be reduced or eliminated, thus reducing the risk of service downtime. The time it takes to get a system into a particular (country) market can be reduced, thus reducing the risk that a defective system will be implemented. The amount of system resources (e.g., storage space and processing bandwidth) needed to manage DPP compliance for multiple consuming services can be reduced and the system can therefore be operated more efficiently. Solutions can be provided that are easier to maintain because the service is on the cloud. For example, to implement a change, this can be done in a single instance and all consuming applications automatically become compliant with the change. That is, the need to maintain the change in different systems can be eliminated. Solutions can be provided that have a reduced total cost of ownership and/or total cost of operations.

Figure 1:
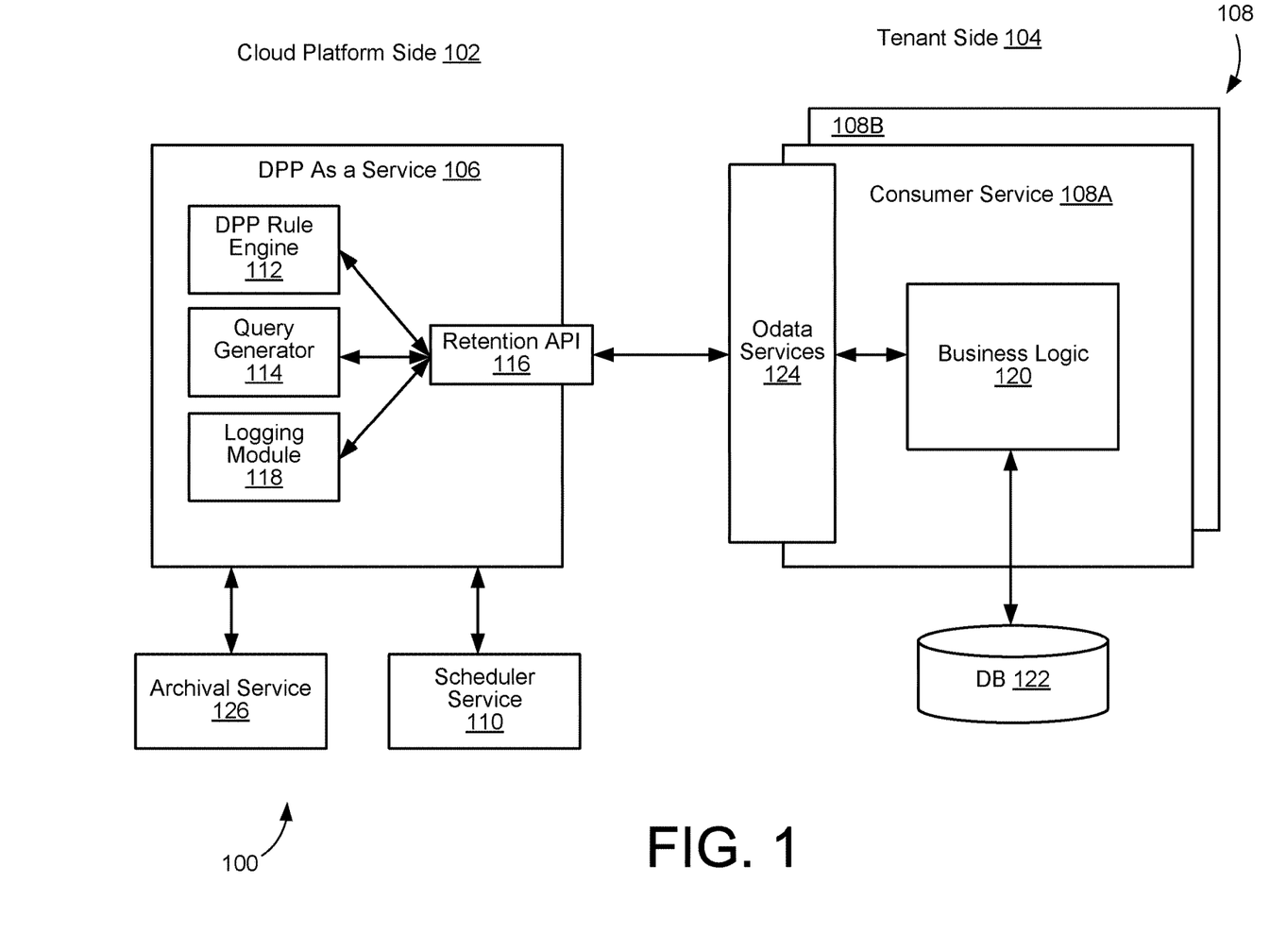
FIG. 1 shows an example of a system where data retention is provided as a service.

FIG. 1 shows an example of a system 100 where data retention is provided as a service. Data retention is an example of a DPP compliance requirement. For example, when a person's data is stored in the system 100 it may be necessary to archive and/or delete the data after a specified amount of time. For example, the time can be triggered by an event, including, but not limited to, that the employee retires from the organization or is terminated. When the term "person" is used herein, it refers to both a natural person (i.e., a human being) as well as a legal person (e.g., a company or other organization) unless the context specifically indicates otherwise.

The system 100 is here schematically organized according to a cloud platform side 102 and a tenant side 104. Solely as an example, the HANA Cloud Platform (HCP) provided by SAP SE can be used to implement the cloud platform side 102. Other cloud platforms can be used.

The cloud platform side 102 here includes a DPP-as-a-service component 106. The component 106 can operate according to a micro-services architecture. For example, the use of micro-services can involve dividing main system functionality, or a monolithic system structure, into independent small services. At a later time, such services can be aggregated or clumped together to make up the monolithic structure. One advantage of the micro-services approach is that one or more of the individual services can be scaled as needed or desired. For example, if one wishes to increase the reporting abilities, the service can be scaled up within the cloud platform without needing to similarly scale up other micro-services. Another advantage can be realized if a micro-service is down: the micro-services architecture can ensure that the remainder of the system remains operational, or can be started, despite the individual service downtime.

The tenant side 104 here corresponds to the domain of one or more consumers 108 of the service(s) provided by the cloud side 102. A consumer service 108A here represents a system (sometimes referred to as a target system) that should enjoy the benefit of service from the DPP-as-a-service component 106. Another system 108B can similarly make use of the same and/or different services provided from the cloud platform side 102. The consumer services 108A-B can include any of various types of target systems. For example, and without limitation, an enterprise-data-as-a-service system (eDaas) and/or a learning management system (LMS) can be included. Either or both of these can be a micro-service that benefits from DPP solutions for their applications on a cloud platform. As such, the DPP-as-a-service component 106 can help these systems meet their purge and archive requirements.

In some implementations, the consumer service 108A is the target system to use the cloud-platform service, and this can be manifest by definition and configuration of one or more rules in the component 106. A scheduler service 110 contains one or more schedules defined for such purpose(s). For example, the scheduler service 110 can be monitoring (constantly, regularly or intermittently), and can decide to take appropriate action. The scheduler service 110 can invoke the DPP-as-a-service component 106, such as on a daily basis.

The consumer service 108A, here the target system, can facilitate such interaction in a convenient and unintrusive way. In some implementations, the target system publishes a generic application programming interface (API), and the DPP-as-a-service component 106 can then simply fire a uniform resource locator (URL), including, but not limited to, an OData URL. For example, a service-generated OData URL can be based on the target system and on the consumer's configuration, and it can serve to request, in an on-demand fashion, that the consumer service 108A delete certain data it has stored. For example, this can facilitate that essentially all intelligence regarding DPP compliance is maintained on the cloud platform side 102 and not on the tenant side 104. As a result, the consumer(s) 108 may not need to know, or can be agnostic, about these and/or other legal requirements. In short, the consumer service 108A can plug in the DPP-as-a-service component 106, perform basic configuration by way of a user interface (UI), which is exemplified below, and the consumer service 108A can then be ready to be implemented or deployed in any country corresponding to the configuration.

As mentioned above, the cloud platform side 102 can support micro-services for multi-tenancy on the tenant side 104. That is, one or more of the consumers 108 can register to a multi-tenancy enabled micro-service. They can then be provided with a new URL and a computation unit. For example, the individual tenants can be uniquely identified using identifiers (IDs). An onboarding process can be performed for each consumer. During the onboarding process, the consumer will register itself and receive the unique URL. In short, the multi-tenancy micro-services can involve two separate consumers 108 (e.g., the consumer service 108A and the consumer service 108B) that are essentially identical to each other. For example, they both provide HCM or other ERP functionality to their respective users. However, because the micro-service provides DPP services in a multi-tenant context, each of the consumers 108 can register itself for one or more countries different from the country or countries for which the other consumer is registered. As noted earlier, the different countries can have different (perhaps partially overlapping) DPP requirements. Therefore, the micro-service can be set up with one or more country-specific rules and configurations for each of the consumers 108.

In some implementations, each application consumer can be identified using a unique ID, here referred to as tenantId. The information about the current consumer can be extracted from the request URL. In such situations, the tenant runtime can only provide a tenantId if the current thread has been started via a hypertext transfer protocol (HTTP) request. In case the current thread was not started via an HTTP request (for example, a background process) the tenant context API may only return a tenant if the current application instance has been started for a dedicated consumer. For example, if the current application instance is shared between multiple consumers and the thread was not started via an HTTP request, the tenant runtime can throw an exception.

The DPP-as-a-service component 106 is deployed on the cloud platform side 102. In some implementations, the component 106 will make use of the services provided by a service architecture of the cloud platform side 102. For example, the service architecture of the HCP from SAP SE can be used. In addition, or otherwise, one or more other cloud platforms can be used. The component 106 can interact with the consumer service 108A to purge data from that target system as applicable.

The DPP-as-a-service component 106 here includes a DPP rule engine 112. In some implementations, the DPP rule engine 112 can be implemented using at least one processor in the cloud platform side 102. The DPP rule engine 112 can be configured to receive retention rule information about the target system (e.g., the consumer service 108A) having a uniform resource identifier (URI). Such retention rule information can reflect a data retention requirement applying to the target system. For example, the data retention requirement can follow from a country-specific DPP regulation. The DPP rule engine 112 can create, using the received retention rule information, a rule that corresponds to the data retention requirement.

The DPP-as-a-service component 106 here includes a query generator 114. In some implementations, the query generator 114 can be implemented using at least one processor in the cloud platform side 102. The query generator 114 can be configured to invoke the rule according to a configuration regarding recurring future invocations of the rule. The query generator 114 can send, based on the invocation of the rule, a first query to the target system (e.g., the consumer service 108A) using the URI. The first query can be configured to extract data from the target system according to a scope defined by the rule. For example, the rule can define the scope such that it includes all data of the consumer service 108A that is potentially affected by DPP regulation.

The cloud platform side 102 receives, such as through a retention API 116 that the cloud platform side 102 makes available to the tenant side 104, the data that was extracted from the target system using the first query. The cloud platform side 102 can apply the rule to the received data, and take an action specified by the rule with regard to the data. For example, the data can be deleted from the consumer service 108A and/or archived.

The DPP-as-a-service component 106 here includes a logging module 118. In some implementations, this can log access to data where that access is covered by DPP regulation. For example, if a company stores employee data in its systems, rules dictate who is allowed to access that data. To ensure compliance, and to be able to respond to unauthorized access, the system can track each instance when the data is accessed. The logging module 118 can perform that tracking and create one or more logs accordingly. For example, the logging module 118 can be implemented as a micro-service in the cloud platform side 102.

The consumer service 108A can include one or more instances of business logic 120. In some implementations, the business logic 120 is configured to perform certain functionality for one or more users. For example, the business logic 120 can provide ERP and/or HCM functionality. The business logic 120 can create, and/or make use of, one or more databases 122 in its operation. For example, the database 122 can store data about one or more persons, thereby making the data subject to DPP regulation(s).

The consumer service 108A can include an OData services component 124. In some implementations, the cloud platform side 102 communicates with the target system (e.g., with the consumer services 108A) via the OData services component 124. For example, the OData services component can be associated with a particular OData entry point which is used for the communication(s).

On the cloud platform side 102, the DPP-as-a-service component 106 can be associated with the scheduler service 110. In some implementations, the scheduler service 110 can be implemented using at least one processor in the cloud platform side 102. The scheduler service 110 can be configured to define, using the received retention rule information about the target system, a configuration that specifies recurring future invocations of the rule.

Against the background of the above examples, a scenario where DPP compliance is ensured by way of deleting data can be described. The cloud platform side 102 can register a target system (e.g., the consumer service 108A) as a consumer service having a URI. The cloud platform side 102 can be configured to provide services to each of multiple consumers 108 (e.g., consumer services 108A-B) services when they are registered. Such services can include a data retention service.

The cloud platform side 102 can receive retention rule information about the target system. Such retention rule information can reflect a data retention requirement applying to the target system. The cloud platform side 102 can create, using the received retention rule information, a rule in the cloud platform side 102 that corresponds to the data retention requirement. Moreover, the cloud platform side 102 can define, using the received retention rule information, a configuration in the cloud platform side 102 (e.g., in the scheduler service 110) that specifies recurring future invocations of the rule.

The cloud platform side 102 can invoke the rule according to the configuration. The cloud platform side 102 can send, based on the invocation of the rule, a first query to the target system using the URI, such as by way of the retention API 116 to the OData services component 124. For example, the first query can be generated by the query generator 114. The first query can be configured to extract data from the target system according to a scope defined by the rule. The cloud platform side 102 can receive (e.g., by way of the retention API 116) the data extracted from the target system using the first query.

The cloud platform side 102 can apply the rule to the received data. For example, this can involve determining whether any data record in the received data is currently subject to a requirement to be deleted (such as because a specific event has occurred or has not occurred). The cloud platform side 102 can then take an action specified by the rule with regard to the data.

As mentioned, multi-tenancy micro-services can be provided. In such situations, two or more consumers 108 (e.g., the consumer services 108A-B) can be registered. Respective retention rule information can then be received for them, reflecting to respective applicable data retention requirements. For each of the consumer services, respective rules and configurations can be created. If the data retention requirements are different for the two consumer services (e.g., because they are being implemented in different countries) the rules and configurations for them can be different, also when the two consumer services are otherwise essentially identical.

As mentioned, DPP compliance can involve a requirement to delete one or more specific data records. The cloud platform side 102 can therefore cause the tenant side 104 to delete the record(s) (e.g., from the database 122). This can be done by way of the action that the cloud platform side 102 takes with regard to the data after applying the rule to that data. Namely, the action can include that the cloud platform side 102 sends a second query (e.g., by way of the retention API to the OData services component 124) to the consumer service 108A. The second query can be based on the cloud platform side 102 having identified, when applying the rule to the received data, a deletion requirement applicable to a data record of the data. As such, the second query can instruct the consumer service 108A to delete the data record from the tenant side 104 (e.g., from the database 122). This approach allows the consumer service 108A, and the tenant side 104 as a whole, to be agnostic about any need to delete its records. Rather it can merely perform the deletion when instructed to by the cloud platform side 102.

The cloud platform side 102 can include an archival service 126. For example, in the European Union (EU) some of the information should be archived or deleted after a certain retention period. In some implementations, not all information will go through the archival/deletion process, but rather, only some specific information may be categorized under this requirement. Periodically (e.g., every month/quarter/year), such information can be archived or deleted. For example, a person's health related information should be archived from the system after the employee leaves an organization because this is very personal information and could be misused.

In some implementations, the archival service 126 is configured to receive a data record of the data from the cloud platform side 102, and archive the data record on the archival service 126. For example, the cloud platform side 102, when applying the rule to the data received from the tenant side 104, can determine that one or more data records should be archived. The cloud platform side 102 can then directly transfer the data record(s) to the archival service 126, without the consumer service 108A being involved in the transfer. This approach allows the consumer service 108A, and the tenant side 104 as a whole, to be agnostic about any need to archive any of its records, as well as of the action that such archival is actually performed.

That is, for archival of data the cloud platform side 102 can fetch the payload from the consumer service 108A and then pass the relevant data record(s) on to the archival service 126 for storage. In some implementations, the payload can cause heavy traffic and the performance of the same can be challenging or uncertain. However, the archival process (and an accompanying purging process on the tenant side 104) can be a non-priority task and may be performed on non-peak hours. For example, to reduce the work load the cloud platform side 102 can execute the tasks in batches.

Accordingly, one or more archival scenarios can take place in the system 100. This can be done by way of the action that the cloud platform side 102 takes with regard to the data after applying the rule to that data. Namely, taking the action can include the cloud platform side 102 sending one or more data records of the received data to the archival service 126. The data record(s) can be sent from the cloud platform side 102 without involving the tenant side 104. The sending of the data record(s) triggers the archival service 126 to archive the data record thereon. The cloud platform can send the data record(s) based having identified, when applying the rule to the received data, an archival requirement applicable to the data record(s).

As indicated, archival can be performed without involving the consumer 108 in the process. However, archival can be combined with deletion of the corresponding data record(s) on the tenant side 104. The cloud platform side 102 can then send (e.g., via the retention API 116 to the OData services component 124) a second query to the target system (e.g., the consumer service 108A). The second query can cause the target system (e.g., the consumer service 108A) to delete the data record(s) on the target system (e.g., delete the data record(s) from the database 122). The second query can be based on the cloud platform side 102 having identified, when applying the rule to the received data, also a deletion requirement applicable to the data record on the target system. As noted above, the cloud platform side 102 can perform the sending of the data record(s) from the cloud platform side 102 to the archival service 126 in multiple batches.

In some implementations, the scheduler service 110 and/or the archival service 126 can be a preexisting component that is put to use in the cloud platform side 102.

In some implementations, masking of data can be performed. In some countries or regions, such as in the EU, regulations exist that dictate that some information must be masked while accessible in an application. The cloud platform side 102 can facilitate such masking on behalf of the consumer 108 (e.g., the consumer service 108A) to which the masking requirement applies. Any implicated information can be masked. For example, a phone number can be masked by inserting a dummy character (here "X") thus: +91 974XXXX449. A credit card number can be masked thus: 4329 XXXX XXXX 1234. An email address can be masked thus: vin***c@sap.com. Such implicated information may be masked, while still being at least partially visible, or otherwise accessible, in the application.

That is, the cloud platform side 102 can provide a masking-of-information service to accomplish this task. This can be one of the micro-services made available to the consumer(s) 108 on the tenant side 104. The cloud platform side 102 can therefore receive masking rule information about the target system (e.g., the consumer service 108A). Such masking rule information can reflect a data masking requirement applying to the target system. The cloud platform side 102 can create, using the received masking rule information, another rule in the cloud platform side 102 that corresponds to the data masking requirement. The cloud platform side 102 can define, using the received masking rule information, another configuration in the cloud platform that specifies recurring future invocations of the other rule. For example, masking should be performed when data is to be made accessible in an application.

In some implementations, reporting of data can be performed. For example, in the EU, some information can still be retained without any archival or deletion even after the retention period, but there must be a reason why the information has been retained. After an employee quits an organization, the person's information such as name, city of residence, etc., can still be retained without any archival or deletion. But the person can still raise the question why such information is needed to be retained.

The cloud platform side 102 can therefore provide a reporting service which can pull such information and also provide the reason(s) why it is still retained and not archived. The cloud platform side 102 can facilitate such reporting on behalf of the consumer 108 (e.g., the consumer service 108A) to which the reporting requirement applies. As such, the micro-services provided by the cloud platform side 102 can further include an information reporting service. The cloud platform side 102 can receive reporting rule information about the target system (e.g., the consumer system 108A). The reporting rule information can reflect a data reporting requirement applying to the target system (e.g., to data in the database 122). The cloud platform side 102 can create, using the received reporting rule information, another rule in the cloud platform that corresponds to the data reporting requirement. The cloud platform side 102 can define, using the received reporting rule information, another configuration in the cloud platform that specifies recurring future invocations of the other rule.

Figure 2:
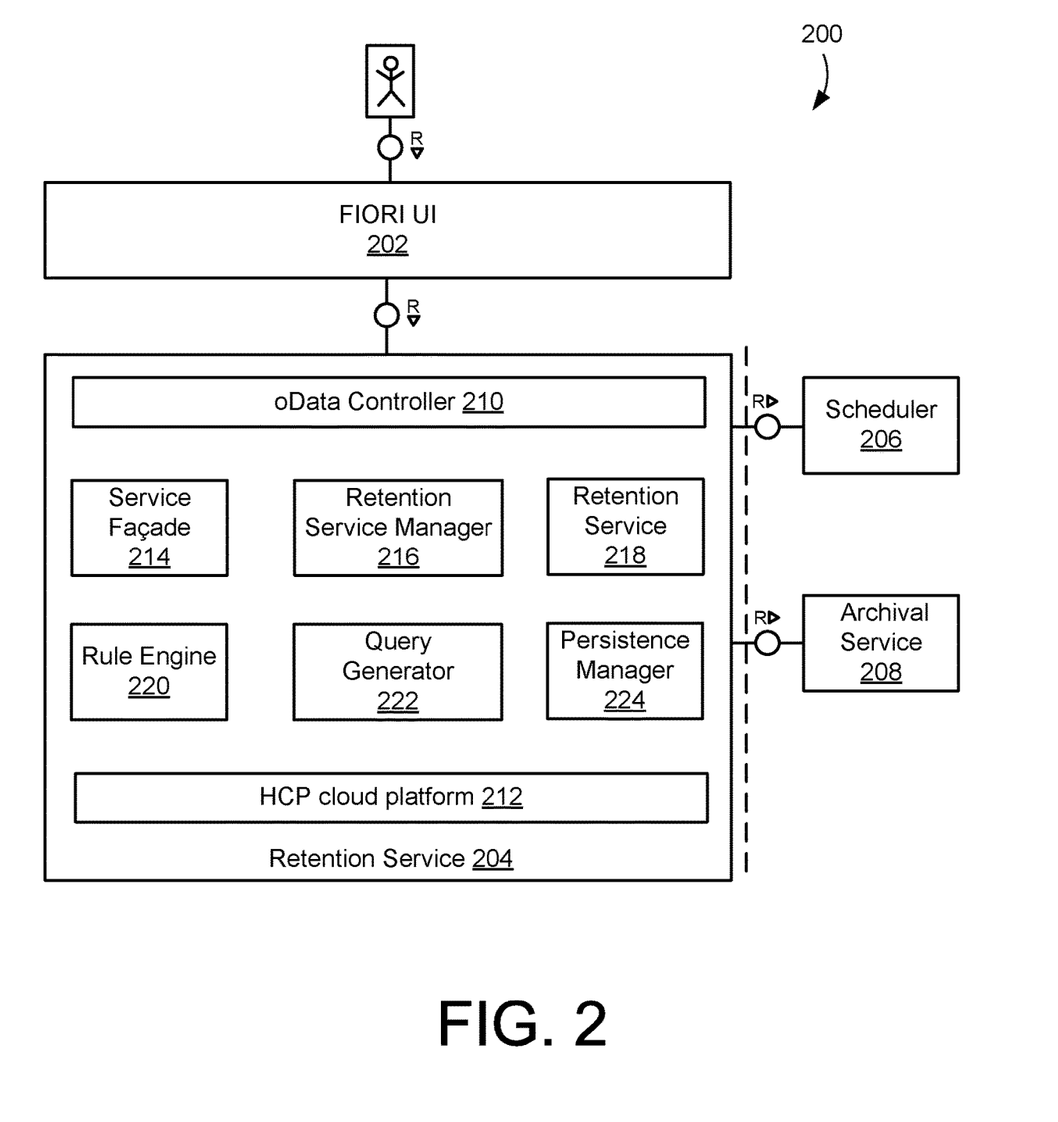
FIG. 2 shows an example of a cloud platform system.

FIG. 2 shows an example of a cloud platform system 200. This example shows an architecture block diagram for purpose of providing a context and overview. In some implementations, a cloud platform (e.g., the SAP HCP) provides the base to deploy micro services. This block diagram describes the high level architecture and the services that can be used by a retention service provided as a service to one or more tenants. The various blocks shown can be involved as part of the service. For example, a FIORI UI 202 can be provided by a Fiori application developed and deployed on the HCP or any other platform. Fiori is a user-centered user interface design from SAP that provides a central and role-based entry point to access applications. The Fiori application can interact with OData end points exposed by a retention service 204 deployed on the HCP. The consumer (e.g., a user or operator of the target system) can access the FIORI UI 202 to cause one or more rules to be defined. For example, the consumer gives an OData entry point to the target system and this is used in creating the configuration for the rule.

The retention service 204 can be used to archive and purge data of consumer applications. That is, the retention service 204 can be deployed as a cloud platform application, and can be consumed by other applications on the cloud platform. In some implementations, a server that handles identity management (e.g., the SAP Identity Server) can be used in this regard. For example, the consumer can have a valid cloud platform account in order to consume the services.

The cloud platform system 200 can include a scheduler service 206. The scheduler service 206 can be similar or identical to the scheduler service 110 (FIG. 1). The scheduler service 206 can at some point take action and, based on a rule configuration, execute or "fire" one or more queries. Data obtained using such query or queries can be received and the retention service 204 can check whether any DPP requirement applies thereto. For example, the data can then be archived. As another example, the data can be deleted from the target system.

The cloud platform system 200 can include an archival service 208. The archival service 208 can be similar or identical to the archival service 126 (FIG. 1).

The cloud platform system 200 can include an OData controller component 210. In some implementations, the OData controller component 210 can generate a URI in order to communicate with the target system (e.g., with a consuming service thereon). The URI can be considered an OData asset. For example, any Fiori application can use an OData endpoint to fetch data and show it on a UI. The cloud platform system 200 can make use of that functionality so that the consumer need not build their own solution for DPP management. Rather, the consumer can plug into the cloud platform system 200 to ensure DPP compliance. OData can be implemented to facilitate transmission of structured query language (SQL) over a network such as the world wide web, or the internet.

The retention service 204 can be implemented on any cloud platform. Here, the HCP 212 from SAP SE is used.

The retention service 204 can include a service façade 214. In some implementations, the service façade 214 serves to abstract the micro-service(s) provided by the cloud platform system 200. It can be considered a proxy for the service(s). The services internal to the cloud platform system 200 and only so much of them as needed is exposed. That is the exposure is tailored to publish what is required to be consumed from the outside (e.g., from the target system). For example, different APIs can be consumed. That is, the API(s), not the actual services, will be published. As such, the service façade 214 can be considered a design pattern in that it internally controls what can or cannot be published over the OData controller 210 for external consumption.

The retention service 204 includes a retention service manager 216. In some implementations, the retention service manager 216 manages the retention services by way of a rule based configuration in order to provide different types of retention services. For example, the OData endpoints can be used.

The retention service 204 includes a retention service component 218. In some implementations, the retention service component 218 can expose the OData APIs to the outside world (e.g., to the target system) so that it or they can interact with the DPP service. For example, this can be done by a representational state transfer (REST) communication.

The retention service 204 includes a rule engine 220. In some implementations, the rule engine 220 defines different rules, such as for one jurisdiction (e.g., Germany) or another (e.g., the US). The rule can be defined based on information that the consumer inputs through the FIORI UI 202. The rule can regulate deletion and/or archival of data, to name just two examples. A defined rule can then be fired based on a configuration associated with the rule. For example, firing can take place at regular intervals or intermittently.

The following scenario exemplifies definition of a retention rule. A business user or administrator can initiate this activity. The activation can address the runtime environment (e.g., the retention service) of the cloud platform system 200. The interaction between the initiator (user/administrator) and the executor (runtime environment) can take place by way of the customer of a service (e.g., an LMS/eDaas service or any other registered consumer of cloud platform micro-service) can initiate the definition of a retention rule. The action of adding a new retention rule can be done by way of a dedicated API that can be invoked by the Fiori application. The rule can be defined using business language provided by the FIORI UI 202 and can be used to purge and/or archive the data. The scheduler service 206 can be used to create the schedule for the firing of the created rule. Similarly, the actions of updating or deleting a retention rule can be done by way of a dedicated API that can be invoked by the Fiori application.

The following scenario exemplifies archival of data. A business user or administrator can initiate this activity. The activation can address the runtime environment of the cloud platform system 200. The scheduler service 206 can start a job that it has scheduled at a specific time. The action of executing a retention rule can be done by way of a dedicated API that can be invoked by the scheduler service 206. The scheduler service 206 can then request the retention service 204 to start the archival process. The retention service 204 can execute an OData query on the consumer service and then collect the data. Finally, the retention service 204 can pass on the data record(s) to the archival service 208 for storage.

The following scenario exemplifies purging of data. A business user or administrator can initiate this activity. The activation can address the runtime environment of the cloud platform system 200. The retention service 204 can initiate this action (e.g., after data has been archived). The purging process can be initiated and tracked for completion. Once the job is complete, the retention service 204 can update the job status as success or failure.

The retention service 204 includes a query generator 222. In some implementations, the query generator 222 facilitates the operation of the scheduler service 206. That is, the scheduler service 206 will use the service(s) offered by the cloud platform system 200, so the scheduler service 206 will need to have a query generated for the target system to get the relevant data so that it can be checked with regard to DPP requirements. Whatever the task, the query generator 222 can generate a query (e.g., an OData query). For example, a dynamic query can be generated based on complex parameters including, but not limited to, the country, the application and/or other statuses such as the person(s) affected by the data.

The retention service 204 includes a persistence manager 224. In some implementations, the persistence manager 224 manages the persistence layer of the cloud platform system 200. For example, the persistence manager 224 can interact with Java persistence API (JPA) repositories and/or Java database connectivity (JDBC) component when applicable.

Figure 3:
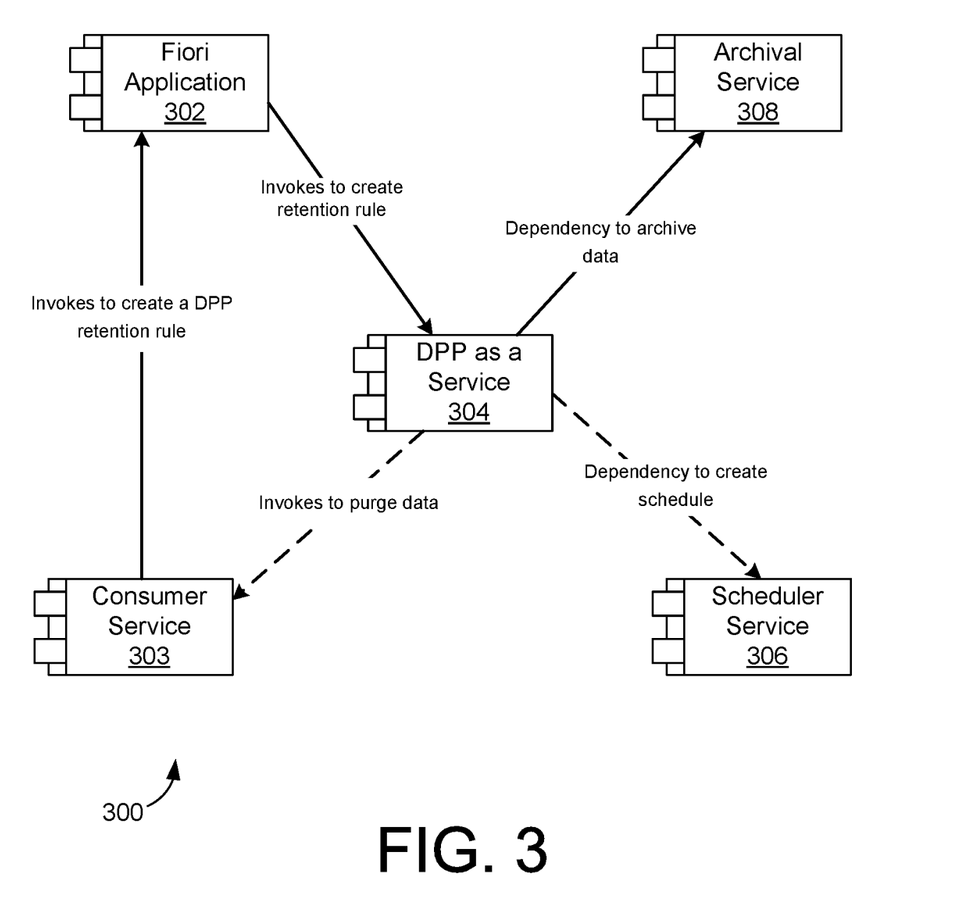
FIG. 3 schematically shows an example of component interaction for providing data protection and privacy (DPP) as a service.

FIG. 3 schematically shows an example of component interaction 300 for providing DPP as a service. A Fiori application 302 for retention can be deployed on a cloud platform (e.g., HCP) and provide the UI to a consumer service 303. The Fiori application 302 can interact with the DPP-as-a-service 304 (e.g., a retention service) and a scheduler service 306 to define, update or delete one or more retention rules. The DPP-as-a-service 304 interacts with the scheduler service 306 to schedule the retention task at a specific time period and specify one or more particular times (e.g., at regular intervals) that the rule should be triggered. The DPP-as-a-service 304 also requests an archival service to archive data which has been queried from the consumer service 303. For example, an OData layer exposed by the consumer service 303 can provide the querying functionality to the DPP-as-a-service 304. The DPP-as-a-service 304 can get the payload from the consumer service 303 and then pass all or some of it to the archival service 308 for storage.

Some or all of the above communications in the component interaction 300 can be done as a workflow. In some implementations, REST calls can be made, such as by REST over HTTP. For example, the communication format can be JavaScript object notation (JSON).

Figure 4:
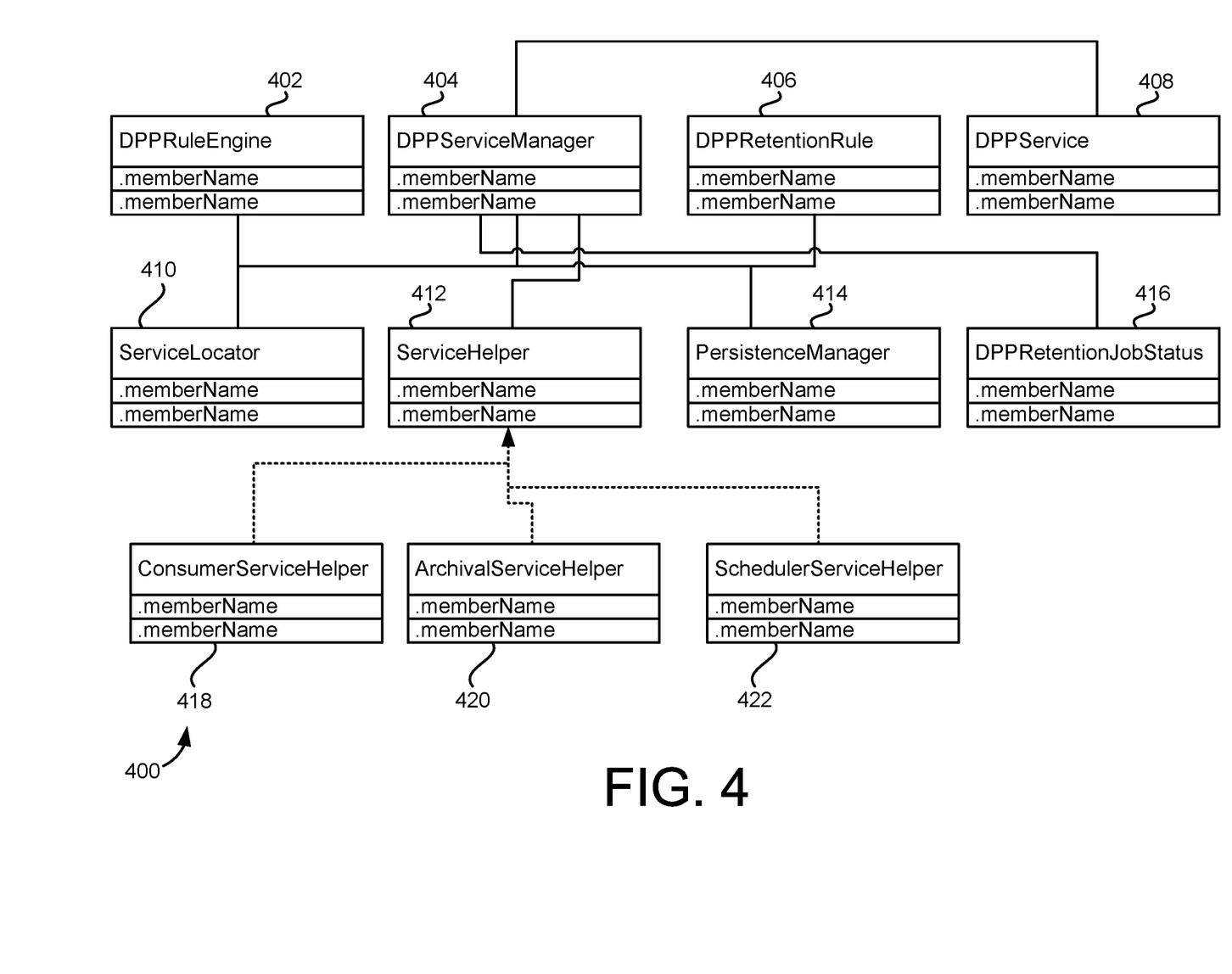
FIG. 4 shows an example of a class diagram for providing DPP as a service.

FIG. 4 shows an example of a class diagram 400 for providing DPP as a service. Here, the class diagram 400 includes rule engine 402, service manager 404, retention rule 406, service 408, service locator 410, service helper 412, persistence manager 414, retention job status 416, consumer service helper 418, archival service helper 420, and scheduler service helper 422. The rule engine 402 can parse the business rule and generate a corresponding OData query for archival and purging. The service manager 404 can be the façade component that interacts with other components such as the service locator 410, persistence manager 414, rule engine 402, and/or others. The retention job status component 416 will implement a framework provided by the scheduler client framework. For example, this component can include business logic to interact with an archival service and a consumer service. The service 408 is a collection of the micro-services offered by the cloud platform. The service 408 will use the service manager 404 to get the service, and the service manager 404 internally will ask the service helper 412 to get the service locator 410. The service locator 410 and the service helper 412 can be part of a pattern in Java terminology. For example, the service locator can give the instances of a service based on a specific configuration or parameter that is being passed through. The service locator can attempt to locate the corresponding service implementation and then return the corresponding service. That is, the service locator 410 and the service helper 412 can be part of internal, or second level, helper classes that are used on an upper layer to obtain different services. The retention job status 416 stores the status of each call, for example in the context of a scheduler job. Each time a job is invoked, the status (e.g., error, issues, successful) can be stored, such as in a log.

Figure 5:
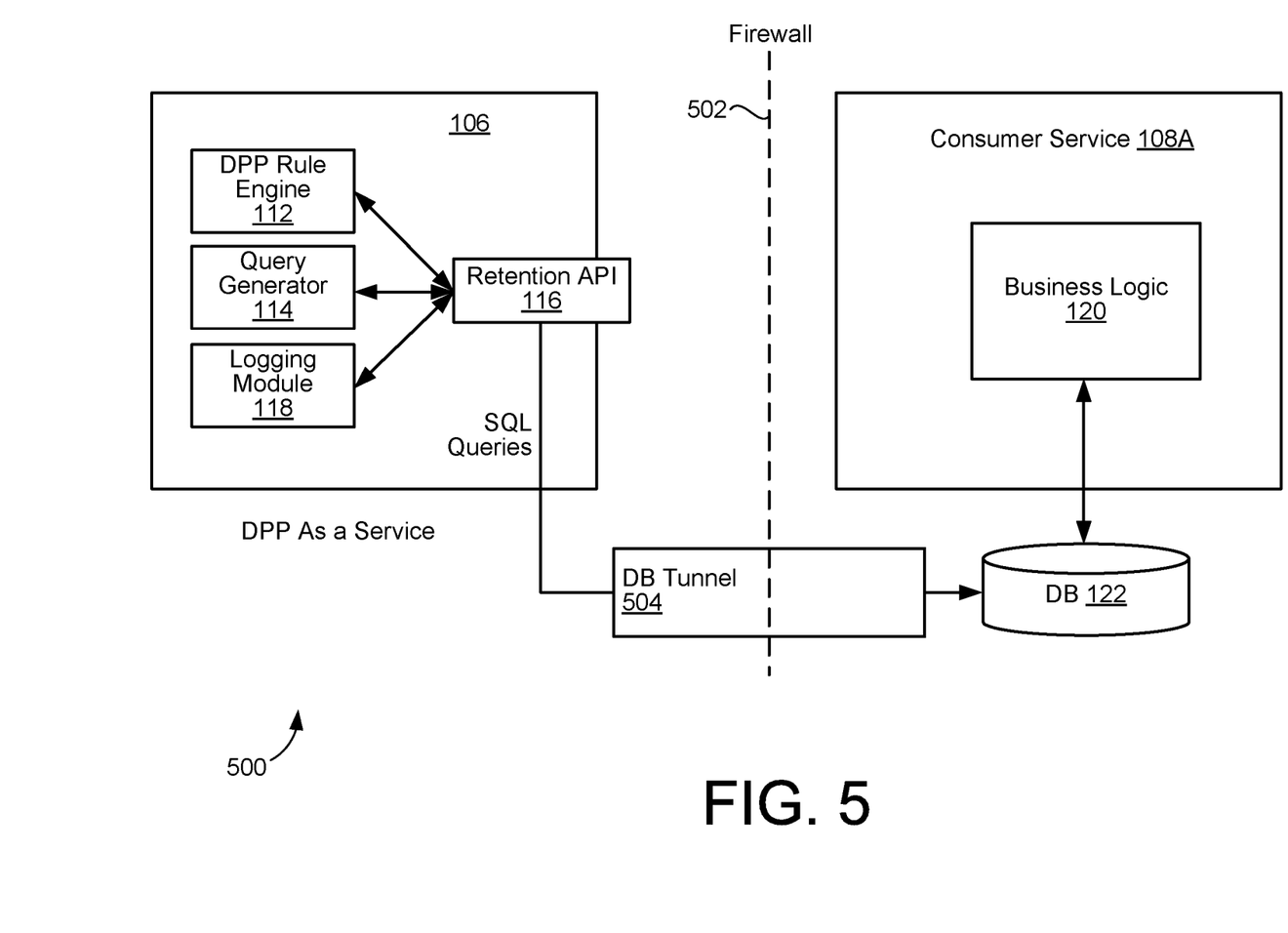
FIG. 5 shows another example of a system where data retention is provided as a service.

FIG. 5 shows another example of a system 500 where data retention is provided as a service. Some components have the same reference numbers as in FIG. 1 and may not be discussed in detail in the following. The system 500 includes a firewall between a cloud platform side and a tenant side. The system 500 also includes a database tunnel component 504 that facilitates the cloud platform system to communicate with the database 122 without going via the business logic 120. For example, the retention API 116 can interact with the database tunnel component 504.

Figure 6:
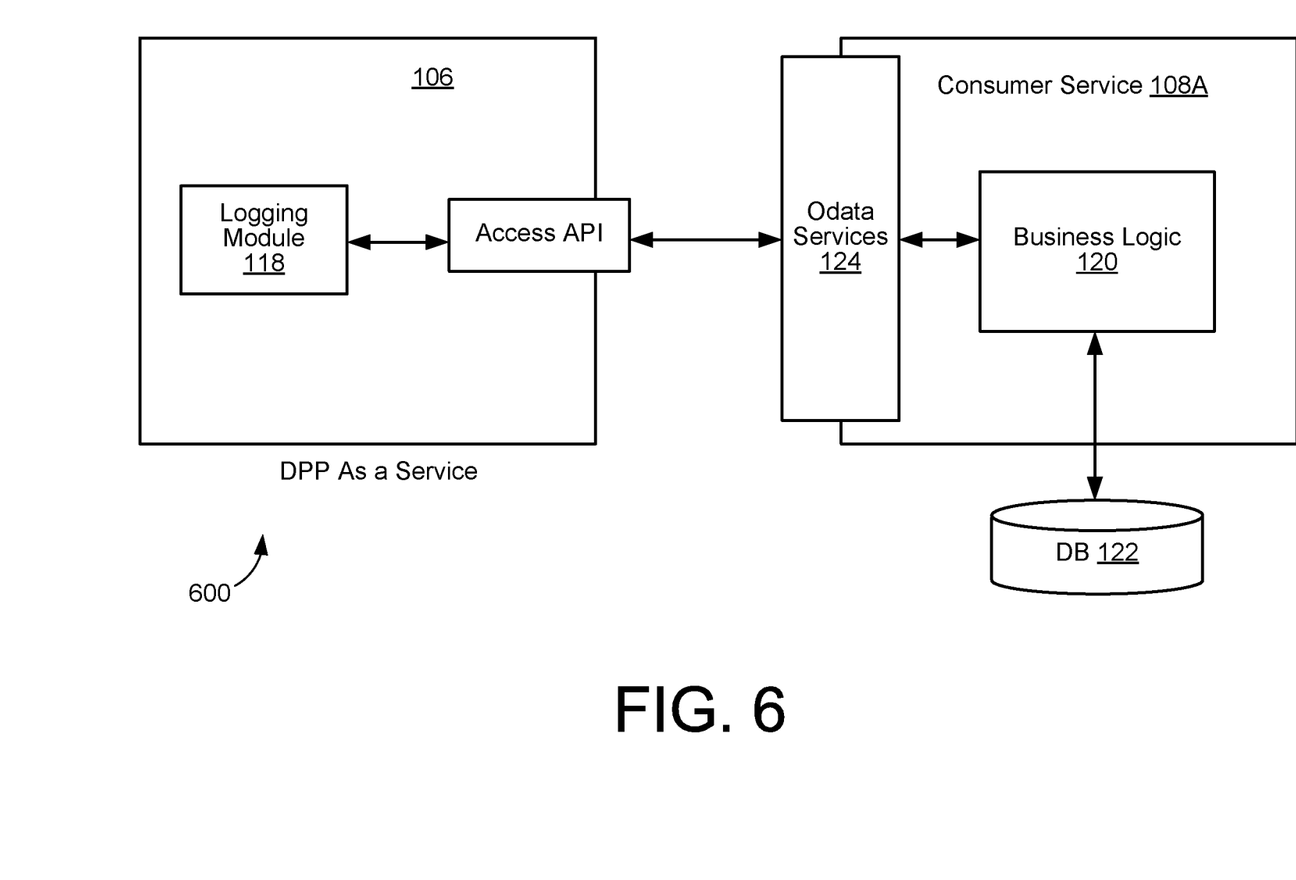
FIG. 6 shows an example of a system where access logging is provided as a service.

FIG. 6 shows an example of a system 600 where access logging is provided as a service. Some components have the same reference numbers as in FIG. 1 and may not be discussed in detail in the following. Some information in the system 600 (e.g., in the database 122) may be classified in a way that only specific users should be allowed to access the information. For example, in the EU it is mandatory to log access information, such as who accessed, when, during which scenario, etc. Such information should be logged in real time. This can be done by the logging module 118. When needed or upon request, an administrator should be able to access the logs and generate reports therefrom.

Figure 7:
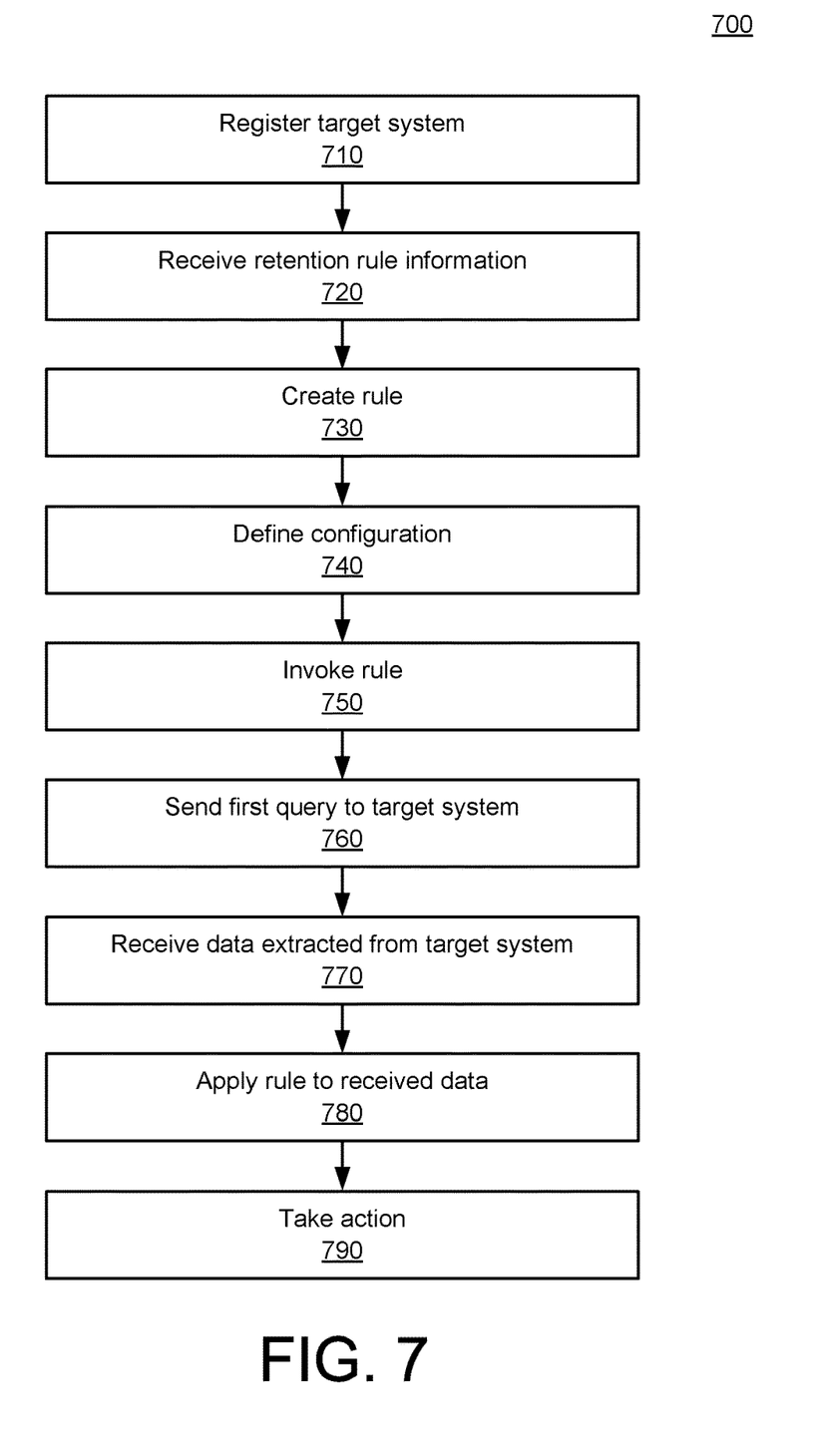
FIG. 7 shows a flowchart of an example of a method.

FIG. 7 shows a flowchart of an example of a method 700. The method 700 can be performed in a computer system, such as by one or more processors executing instructions stored in a non-transitory medium. For example, the method 700 can be performed in any system shown or described herein. In some implementations, two or more operations of the method 700 can be performed in a different order. More or fewer operations than shown can be performed in some implementations. In the following, elements from one or more of FIGS. 1-6 will be mentioned for exemplary purposes.

At operation 710. a target system is registered. In some implementations, a cloud platform registers a first target system as a first consumer service having a URI. The cloud platform can be configured to provide services to each of multiple consumer services when registered, such services including a data retention service. For example, the consumer service 108A can be registered at the cloud platform side 102.

At operation 720, retention rule information is received. In some implementations, the cloud platform receives first retention rule information about the first target system. The first retention rule information can reflect a first data retention requirement applying to the first target system. For example, the consumer service 108A can be implemented in a country having a specific data retention requirement.

At operation 730, a rule is created. In some implementations, the rule corresponds to the first data retention requirement and is created in the cloud platform using the received first retention rule information. For example, a rule for the consumer service 108A can be created.

At operation 740, a configuration is defined. In some implementations, the received first retention rule information is used to define a first configuration in the cloud platform that specifies recurring future invocations of the first rule. For example, the rule can be invoked regularly or intermittently.

At operation 750, the rule is invoked. In some implementations, the rule is invoked according to the first configuration. For example, the configuration can specify daily, weekly or monthly invocation of the rule.

At operation 760, a first query is sent to the target system. In some implementations, based on the invocation of the first rule, the first query is sent to the first target system using the URI, the first query configured to extract data from the first target system according to the first rule. For example, the query extracts relevant information from the target system to determine if the information should be archived and/or deleted.

At operation 770, data extracted from the target system is received. In some implementations, the cloud platform receives the data extracted from the first target system using the first query. For example, this can be data about one or more persons, such as an employee or an organization.

At operation 780, the rule is applied to the received data. In some implementations, the rule is applied at the cloud platform. For example, the cloud platform side 102 can apply one or more rules to data received from the consumer service 108A.

At operation 790, at least one action is taken. In some implementations, an action specified by the first rule can be taken with regard to the data or with regard to the received data. For example, the data on the target system can be deleted, such as by way of sending a second query to the target system. As another example, the received data on the cloud platform can be archived by sending the received data to an archival system.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one processor to:
   register, at a multi-tenant cloud platform, a first target system having a uniform resource identifier (URI), the multi-tenant cloud platform configured to provide consumer services to multiple target systems of two or more tenants when registered, the consumer services including a data retention service for purging data stored on the multiple target systems;
   receive, at the multi-tenant cloud platform, first retention rule information about the first target system, the first retention rule information reflecting a first data retention requirement to purge data from the first target system;
   create, using the received first retention rule information, a first rule in the multi-tenant cloud platform that corresponds to the first data retention requirement;
   define, using the received first retention rule information, a first configuration in the multi-tenant cloud platform that specifies recurring future invocations of the first rule;
   invoke the first rule according to the first configuration;
   generate a first query configured to extract data from the first target system according to a scope defined by the first rule;
   send, by the multi-tenant cloud platform based on the invocation of the first rule, the first query to the first target system using the URI;
   receive, at the multi-tenant cloud platform, the data extracted from the first target system using the first query;
   apply, at the multi-tenant cloud platform, the first rule to the received data;
   identify, when applying the first rule to the received data, a deletion requirement applicable to a first data record; and
   based on having identified the deletion requirement, send, by the multi-tenant cloud platform, a second query to the first target system to delete the first data record from the first target system.

2. The computer program product of claim 1, wherein the instructions are further configured to cause the at least one processor to send a second data record of the received data, from the multi-tenant cloud platform to an archival system to archive the second data record on the archival system, the sending being based on identifying, when applying the first rule to the received data, an archival requirement applicable to the second data record.

3. The computer program product of claim 2, wherein the first data record deleted from the first target system is the same as the second data record archived on the archival system.

4. The computer program product of claim 2, wherein the instructions are further configured to cause the at least one processor to perform the sending of the second data record from the multi-tenant cloud platform to the archival system in multiple batches.

5. The computer program product of claim 1, wherein the first target system is implemented to operate in a first country, wherein the first data retention requirement is specific to the first country, and wherein the instructions are further configured to cause the at least one processor to:
   register, at the multi-tenant cloud platform, a second target system, the second target system essentially identical to the first target system except for being implemented to operate in a second country;
   receive, at the multi-tenant cloud platform, second retention rule information about the second target system, the second retention rule information reflecting a second data retention requirement that is specific to the second country and applies to the second target system, the second retention rule information and the second data retention requirement being different from the retention rule information and the data retention requirement, respectively;
   create, using the second received retention rule information, a second rule in the multi-tenant cloud platform that corresponds to the second data retention requirement, the second rule different from the first rule; and
   define, using the second received retention rule information, a second configuration in the multi-tenant cloud platform that specifies recurring future invocations of the second rule, the second configuration different from the first configuration.

6. The computer program product of claim 1, wherein the consumer services further include an access restriction service, and wherein the instructions are further configured to cause the at least one processor to:
   receive, at the multi-tenant cloud platform, access rule information about the first target system, the access rule information reflecting a data access restriction applying to the first target system;
   create, using the received access rule information, a second rule in the multi-tenant cloud platform that corresponds to the data access restriction; and define, using the received access rule information, a second configuration in the multi-tenant cloud platform that specifies recurring future invocations of the second rule.

7. The computer program product of claim 1, wherein the consumer services further include a masking-of-information service, and wherein the instructions are further configured to cause the at least one processor to:
receive, at the multi-tenant cloud platform, masking rule information about the first target system, the masking rule information reflecting a data masking requirement applying to the first target system;
create, using the received masking rule information, a second rule in the multi-tenant cloud platform that corresponds to the data masking requirement; and
define, using the received masking rule information, a second configuration in the multi-tenant cloud platform that specifies recurring future invocations of the second rule.

8. The computer program product of claim 1, wherein the consumer services further include an information reporting service, and wherein the instructions are further configured to cause the at least one processor to:
receive, at the multi-tenant cloud platform, reporting rule information about the first target system, the reporting rule information reflecting a data reporting requirement applying to the first target system;
create, using the received reporting rule information, a second rule in the multi-tenant cloud platform that corresponds to the data reporting requirement; and
define, using the received reporting rule information, a second configuration in the multi-tenant cloud platform that specifies recurring future invocations of the second rule.

9. A cloud platform system comprising:
one or more non-transitory memories;
one or more processing units coupled to the one or more non-transitory memories; and
one or more computer-readable storage media storing instructions that, when loaded into the one or more non-transitory memories, cause the one or more processing units to perform operations comprising:
receive retention rule information about a target system having a uniform resource identifier (URI), the retention rule information reflecting a data retention requirement to purge data from the target system;
create, using the received retention rule information, a rule that corresponds to the data retention requirement;
define, using the received retention rule information, a configuration that specifies recurring future invocations of the rule;
generate a first query configured to extract data relevant to the retention rule information received from the target system according to a scope defined by the rule; and
invoke the rule according to the configuration, and send, based on the invocation of the rule, the first query to the target system using the URI;
wherein the cloud platform system receives the data extracted from the target system using the first query, applies the rule to the received data, and sends a second query to the target system to delete a data record from the target system, wherein the second query is based on identifying, when applying the rule to the received data, a deletion requirement applicable to the data record.

10. The cloud platform system of claim 9, the operations further comprising: receive the data record from the cloud platform, and archive the data record.

11. The cloud platform system of claim 9, wherein the target system comprises business logic, a database, and an Open Data Protocol (OData) services component, and wherein the cloud platform system communicates with the target system via the OData services component.

12. The cloud platform system of claim 9, wherein the target system comprises business logic and a database, and has a firewall toward the cloud platform system, and wherein the cloud platform system further comprises a database tunnel component that facilitates the cloud platform system to communicate with the database without going via the business logic.

13. The cloud platform system of claim 11, wherein the cloud platform system further tracks access to the database based on its communication with the target system via the OData services component.

14. A method comprising:
registering, at a multi-tenant cloud platform, a target system having a uniform resource identifier (URI), the multi-tenant cloud platform configured to provide consumer services to multiple target systems of two or more tenants when registered, the consumer services including a data retention service for purging data stored on the multiple target systems;
receiving, at the multi-tenant cloud platform, retention rule information about the target system, the retention rule information reflecting a data retention requirement applying to the target system;
creating, using the received retention rule information, a rule in the multi-tenant cloud platform that corresponds to the data retention requirement;
defining, using the received retention rule information, a configuration in the multi-tenant cloud platform that specifies recurring future invocations of the rule;
invoking the rule according to the configuration;
generating, by the multi-tenant cloud platform, a first query configured to extract data from the target system according to a scope defined by the rule;
sending, based on the invocation of the rule, the first query to the target system using the URI, the first query configured to extract data from the target system according to the rule;
receiving, at the multi-tenant cloud platform, data extracted from the target system using the first query;
applying, at the multi-tenant cloud platform, the rule to the received data;
identifying, when applying the rule to the received data, an archival requirement applicable to a data record;
based on identifying the archival requirement, archiving the data record on an archival system, wherein the archiving comprises sending the data record from the multi-tenant cloud platform to the archival system;
identifying, when applying the rule to the received data, a deletion requirement applicable to the data record; and
based on identifying the deletion requirement, deleting the data record from the target system, wherein the deleting comprises sending, by the multi-tenant cloud platform, a second query to the target system.

15. The method of claim 14, wherein sending the data record from the multi-tenant cloud platform to the archival system is executed in multiple batches.

16. The method of claim 14, wherein the target system comprises business logic and a database, and has a firewall toward the multi-tenant cloud platform, and wherein the multi-tenant cloud platform further comprises a database tunnel component, the method further comprising communicating with the database without going via the business logic.

\* \* \* \* \*